(12) United States Patent
Byrne

(10) Patent No.: US 7,840,756 B2
(45) Date of Patent: Nov. 23, 2010

(54) RAID STORAGE SYSTEM WITH TANDEM OPERATION USING MULTIPLE VIRTUAL PROFILES

(75) Inventor: Richard Joseph Byrne, Hillsborough, NJ (US)

(73) Assignee: Agere Systems Inc., Allentown, PA (US)

( * ) Notice: Subject to any disclaimer, the term of this patent is extended or adjusted under 35 U.S.C. 154(b) by 506 days.

(21) Appl. No.: 11/982,262

(22) Filed: Oct. 31, 2007

(65) Prior Publication Data

US 2009/0113127 A1    Apr. 30, 2009

(51) Int. Cl.
G06F 12/16    (2006.01)
(52) U.S. Cl. .................. 711/114; 711/163; 711/165
(58) Field of Classification Search .................. None
See application file for complete search history.

(56) References Cited

U.S. PATENT DOCUMENTS 7,558,931 B2 *   7/2009   Ishida et al. ................. 711/163
2006/0085604 A1 *   4/2006   Guthrie et al. ............... 711/141
2008/0282030 A1 *   11/2008   Kalwitz et al. ............... 711/114
2009/0077333 A1 *   3/2009   Byrne et al. ................. 711/163

* cited by examiner

*Primary Examiner*—Jack A Lane

(57) ABSTRACT

An improved RAID storage system adapted to selectively and automatically store the same data "in tandem" using two different storage profiles. In one embodiment, a first store operation occurs in accordance with first storage profile and, if a flag in the first storage profile is set, a second store operation automatically occurs in accordance with a second storage profile but with the same data as stored in the first store operation. The first and second storage profiles are stored sequentially in profile registers within a controller in the storage system. To speed the tandem operation, the data may be held in a re-readable FIFO buffer in the controller. The buffer is sized to hold the minimum size of data that can be stored to the physical disks in the storage system. Preferably, the size of the buffer is substantially equal to the minimum size.

26 Claims, 2 Drawing Sheets

RAID STORAGE SYSTEM WITH TANDEM OPERATION USING MULTIPLE VIRTUAL PROFILES

TECHNICAL FIELD

The present invention relates to data storage devices, and, in particular, to redundant array disk storage systems or the like.

BACKGROUND

Redundant Array of Independent (or Inexpensive) Disks (RAID) storage systems are being used to provide data storage for consumer and enterprise applications. Advantageously, the RAID systems can be configured to provide redundancy to the stored data so that should one or more (depending on the configuration) physical disk drives fail (or "degrade"), the data stored in the RAID system can be retrieved without loss of the stored data. The configuration of the RAID system is referred to as the "level" of the RAID system. For example, while a RAID-level 0 (referred to as a RAID-0 configuration) provides no redundancy, a RAID-level 1 (RAID-1) system uses data mirroring across two different physical disk drives to provide data redundancy. A different technique to providing data redundancy is a RAID-level 4 (RAID-4) system that has at least three disk drives and involves a block-interleaved, dedicated parity disk that allows for the data on a degraded disk to be reconstructed. There are other possible RAID system configurations, including combinations of RAID-levels; see U.S. patent application Ser. No. 11/544,442, incorporated herein in its entirety by reference.

As taught in the above-referenced patent application, a RAID system may be configured to implement one or more RAID-levels in accordance with a Virtual Array Profile (VAP). The RAID system is accessed using the VAP that defines a virtual array associated with the physical disk drives of the RAID system. This allows for the RAID system to be configurable as needed by a user. However, should the user desire to store the same data in RAID system using a different RAID configuration, e.g., providing additional data redundancy, the user must resend the same data to the RAID system configured using a different VAP. To do so might use so much extra system bandwidth that the RAID system no longer operates at a data rate needed by the user.

SUMMARY

In one embodiment, the present invention is a method of accessing a RAID system having a plurality of physical storage devices. The method comprises the steps of: buffering data in a memory in the RAID system; storing the buffered data in at least one of the plurality of physical storage devices in accordance with a first storage profile; and storing the buffered data in at least one of the plurality of physical storage devices in accordance with a second storage profile different from the first storage profile.

In still another embodiment, the present invention is a RAID system, having a plurality of physical storage devices, comprising a memory adapted to hold data therein as buffered data. The RAID system is adapted to store, in accordance with a first storage profile, the buffered data in at least one of the plurality of physical storage devices. The RAID system is further adapted to store, in at least one of the plurality of physical storage devices, the buffered data in accordance with a second storage profile different from the first storage profile.

BRIEF DESCRIPTION OF THE DRAWINGS

The aspects, features, and advantages of the present invention will become more fully apparent from the following detailed description, the appended claims, and the accompanying drawings in which like reference numerals identify similar or identical elements.

DETAILED DESCRIPTION

Figure 1:
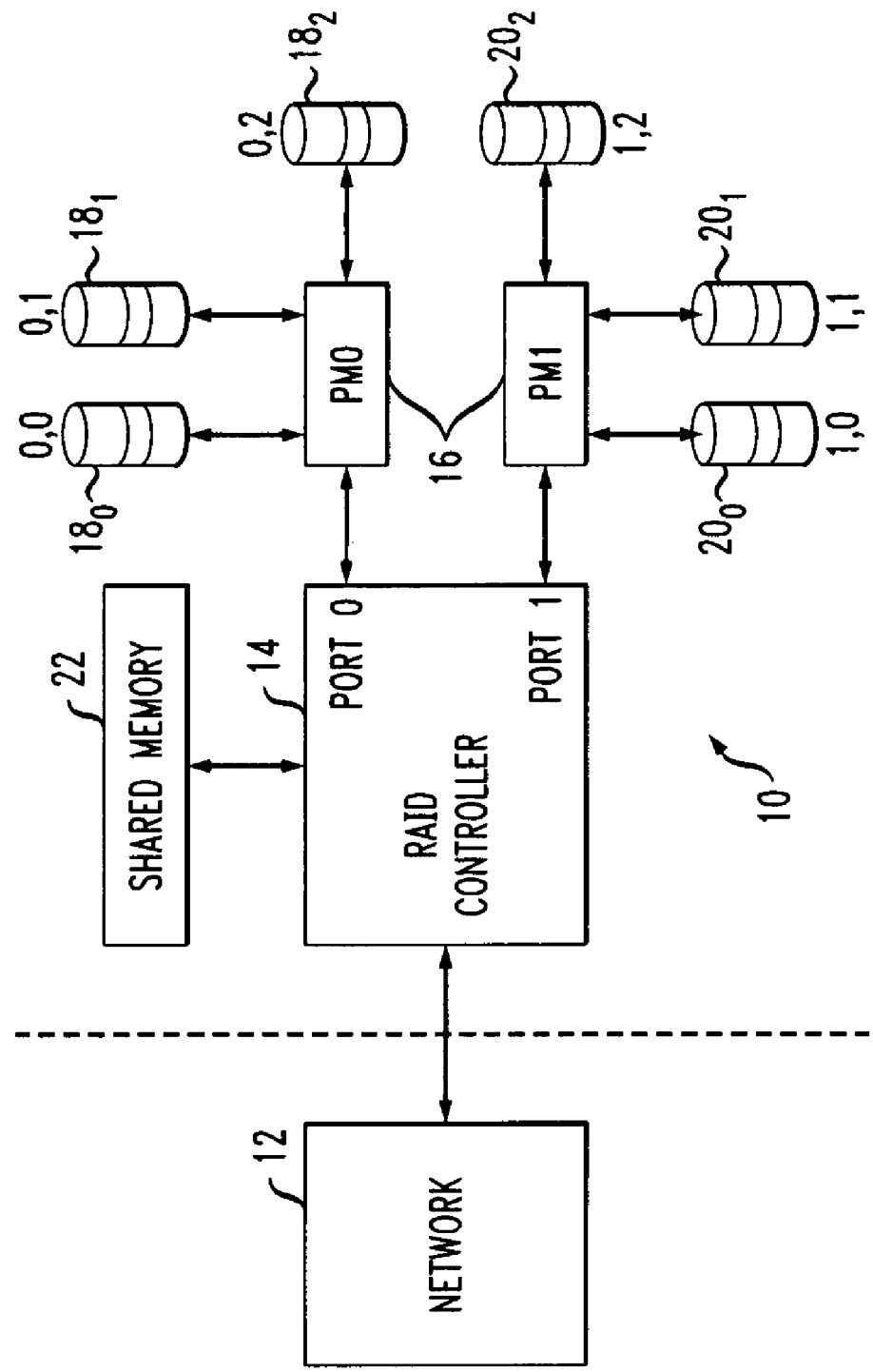
FIG. 1 is a simplified block diagram of a RAID system according to one exemplary embodiment of the present invention.

| Acronyms and Definitions | |
|---|---|
| BPR | Block-Parity Reconstructor sub-block |
| CRC | Cyclic Redundancy Check code |
| CSR | Control/Status Register sub-block |
| FIFO | First-in, first-out |
| IRM | Issued Request Memory |
| LBA | Logical Block Address |
| MDC | Multi-Drive Controller |
| PM# | Port Multiplier No. # |
| PMP# | Port Multiplier Port No. # |
| RDE | RAID Decoder/Encoder |
| RIF | Read Interface sub-block |
| ROS | Read Operation Sequencer sub-block |
| RVA | Reverse-Annotation decoder for Data Sector Addresses |
| TDB | Tandem Duplication Buffer |
| TMI | Traffic Manager Interface sub-block |
| WIF | Write Interface sub-block |
| WOS | Write Operation Sequencer sub-block |
| VAP | Virtual Array Profile |

The term "disk array," "RAID array," "RAID system," "drive array," "physical array," and "array" are used interchangeably herein to identify a RAID array, i.e., a physical array of two or more physical disk drives.

The terms "RAID-Array Cluster" (RAC), "cluster," "array cluster," "virtual array cluster," "virtual array," and "virtual RAC" are used interchangeably and are used to refer to a virtual RAID array, as defined by a storage profile. A storage profile (also referred to herein as a "profile," and "array profile," or "cluster profile") is a Virtual Array Profile (VAP) and logical-to-physical mapping data. In at least one embodiment of the invention, a plurality of virtual arrays exist, each having a storage profile that defines the parameters of the virtual RAC. In prior art RAID arrays, a single set of physical disk drives is defined by only a single profile that might be modified from time to time. However, in at least one embodiment of the invention employing virtual arrays, a plurality of storage profiles can simultaneously exist for a single set of physical disk drives, and the structure and functionality of such embodiments permit more than one virtual array for the same set of physical disk drives to be addressed and used substantially concurrently for retrieval and/or store operations. Similarly, in other embodiments, a plurality of storage profiles can exist for multiple sets of physical drives with less than all of the physical drives in common with each set of physical drives.

A "logical drive" is a "virtual" drive that corresponds' (mapped) to one or more physical drives or a portion of a physical drive.

A sector is the basic unit of data used in retrieval and store operations and consists of a uniquely addressable set of data of a predetermined size (typically 512 bytes). Sectors correspond to small arcs of tracks on disk drive platters that move past read/write heads on a disk as the disk rotates.

A "chunk" (also referred to herein as a "block") is the smallest amount of data per store operation that is written to an individual disk in an array, expressed as an integer multiple of sectors. This amount is referred to as the array's "chunk size." A chunk contains either parity information or data.

A stripe is a set of chunks that includes one chunk collected from each drive in the array. The term "stripe index" will be used to refer to a numerical address identifying a stripe within an array.

A Data Sector Unit (DSU) is a sector's worth of data.

A Data Sector Address (DSA) is an address that is used to refer to a particular DSU in the array and the DSUs are preferably numbered sequentially.

A Logical Block Address (LBA) is an address that is used to refer to a sector on an individual physical disk drive and the LBAs are preferably numbered sequentially.

A Stripe Sector Unit (SSU) is a set of sectors that includes one sector collected from each drive in the array. The set of sectors in an SSU have the same LBA, and thus, a specific SSU is referenced by the common LBA of its member sectors. For block-interleaved, distributed-parity disk array with N drives (e.g., RAID-5), an SSU holds N−1 data sectors, plus one sector of parity information. The term "sector level" will be used to refer collectively to the corresponding addresses of the drives at which an SSU is stored.

EXEMPLARY EMBODIMENTS OF THE INVENTION

For purposes here, signals and corresponding nodes, ports, inputs, or outputs may be referred to by the same name and are interchangeable. Similarly, the contents of a register and the register's name may be referred to by the same name and are interchangeable.

Referring to FIG. 1, an exemplary embodiment of the invention is shown, in which a simplified block diagram of RAID storage system 10 is shown interfacing to a network 12. The RAID system 10 comprises a RAID controller 14 and, in this example, two optional port multipliers (PM0, PM1) 16. Coupled to each PM 16 are corresponding physical disk drives $18_0$-$18_2$ and $20_0$-$20_2$ (sometimes referred to herein as physical drives 18, 20) As will be discussed in more detail below, the controller 14 controls access to the physical drives 18, 20 in response to store and retrieval requests from the network 12. Optional PMs 16, as will be described in more detail below, serves to increase the effective number of ports on the controller 14 (e.g., port0, port1) so that more physical drives can be coupled to the controller 14 than there are ports on the controller. Some or all of the PMs 16 may be eliminated and the physical drives 18, 20 coupled to corresponding ports on the controller 14. The physical drives are preferably Serial AT Attachment (SATA), Small Computer Serial Interface (SCSI), or Serial Attached SCSI (SAS) hard disk drives, but other drives may be used, including solid-state drives (e.g., FLASH).

Data to and from the network is temporarily stored in shared-memory 22. The shared-memory 22 buffers the data (typically packets of data to and from network 12), array control information, and instructions used by an application processor (not shown). The memory 22 is typically implemented as a DRAM or SRAM semiconductor memory array separate from the controller 14, and the bandwidth of the memory 22 (e.g., as measured in megabytes per second) for reading and writing to the memory 22 is generally limited by the speed of the memory 22. The speed at which the controller 14 can transfer data between the network 12 and the physical drives 18, 20, is typically bound by the bandwidth of the memory 22.

Preferably, the controller 14 interfaces with the network 12 via Ethernet or other high speed MAN/WAN network interface, such as IEEE 802.11. In addition, the controller 14 may use a USB bus or IEEE 1394 bus interface for coupling to a personal computer or the like.

Figure 2:
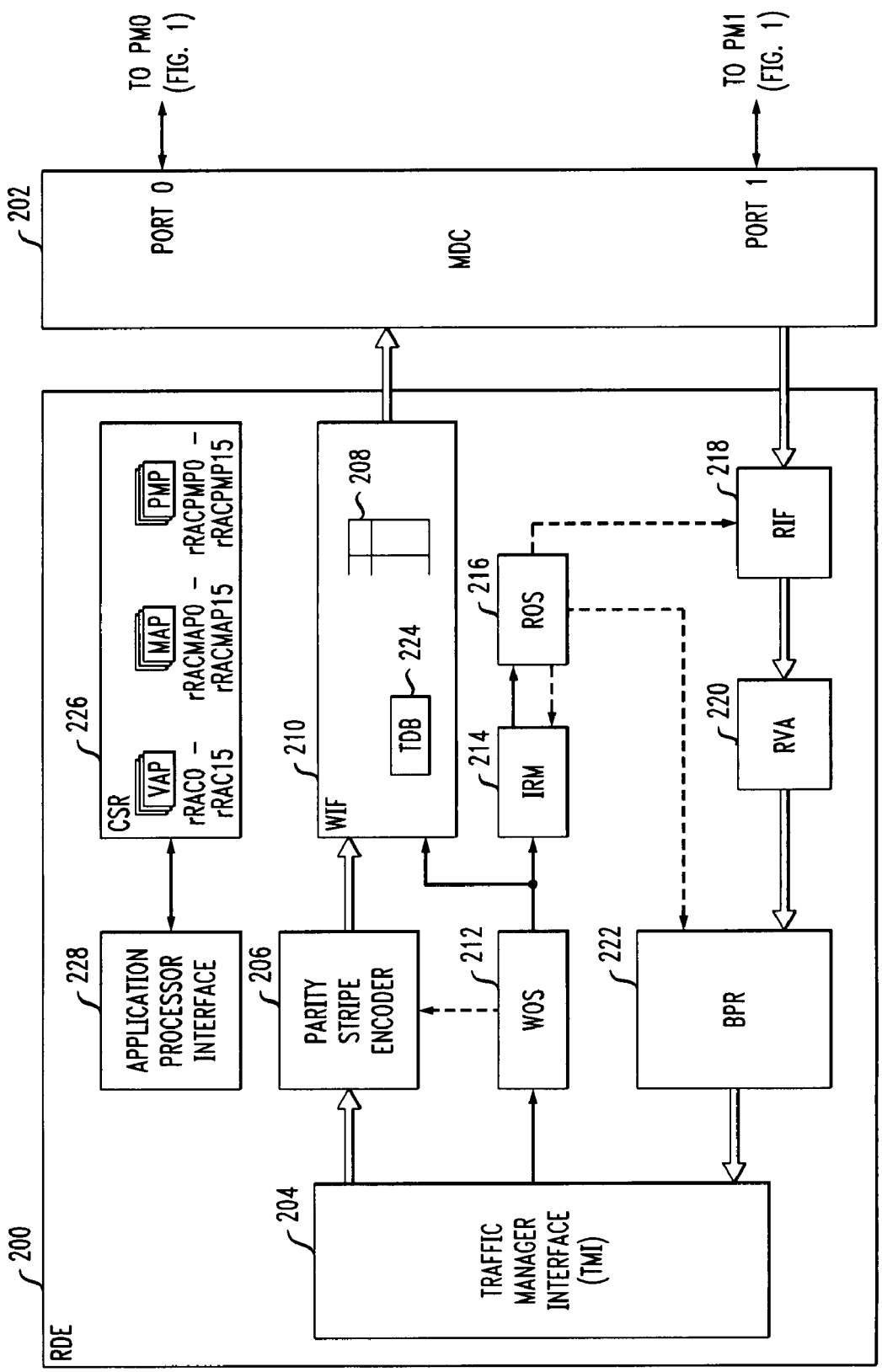
FIG. 2 is a simplified, high-level data and control signal flow block diagram of RDE and MDC functional blocks of a RAID system controller for use in the system of FIG. 1.

FIG. 2 diagrams a portion of the controller 14, here an RDE 200 and an MDC 202. The controller 14 in this embodiment includes other functional blocks (not shown), such as a traffic manager, an application processor, protocol processor, a shared-memory controller, a network controller, and a peripheral traffic controller. Generally, the traffic manager passes data between the network 12 (FIG. 1) and the RDE 200 via the shared memory 22 (FIG. 1). The application processor controls all of the above functional blocks and configures the functional blocks, including the RDE 200 and MDC 202, in response to commands received from the network 12. All of the functional blocks are described in the above-referenced patent application and, except the RDE 200 and MDC 202, are not described further herein.

The RDE 200 performs RAID encoding and decoding of data to and from the physical (SATA) disk drives (18 and 20 of FIG. 1) via MDC 202. The MDC 202 provides a point-to-point multiple-independent channel interface between the RDE 200 and the physical drives 18, 20 (FIG. 1). Flow-control protocols regulate communications between the RDE 200 and the MDC 202. For a retrieval operation, the MDC 202 deserializes and decodes data received from the SATA drives 18, 20 and checks the data for integrity prior to transferring the data to the RDE 200. For a store operation, the MDC 202 serializes and encodes data received from the RDE 200 for transmission to the SATA drives 18, 20. In this example and during a store, a starting LBA is generated by RDE 200 and provided to the MDC 202 along with DSUs to be written. The MDC 202 then formats the DSU data into frames, encodes the framed data, appends a CRC, and serializes the data for transmission to the SATA drives 18, 20. As explained in the above-referenced patent application, the RDE 200, in addition to other functions described below, translates between (i) LBAs, which refer to sectors of individual physical drives 18, 20, and (ii) DSAs and SSUs, which refer to sectors with respect to the entire array of physical disk drives 18, 20.

The RDE 200 in FIG. 2 receives and sends data to the network 12 (FIG. 1) via the traffic manager functional block (not shown) in controller 14 (FIG. 1). Data to be written to the physical drives 18, 20 (FIG. 1) passes from the traffic manager, in conjunction with shared memory 22 (FIG. 1), via TMI 204 and to a parity stripe encoder 206. Encoder 206 generates block-parity data for storage in the physical drives 18, 20 when the RAID system 10 (FIG. 1) is operating at RAID-levels having parity redundancy, e.g., RAID-4. The data (including any parity data) is then buffered by FIFO buffer 208 in WIF 210 and the buffered data is passed to MDC 202 for eventual transmission to the physical drives 18, 20. WOS 212 sends storage requests to the WIF 210 and copies storage and retrieval requests to IRM 214. The ROS 216 processes retrieval requests that ROS 216 was notified of by IRM 214. The ROS 216 controls operation of the RIF 218 and BPR 222 during retrievals. Retrieved data from the MDC 202 passes through the RIF 218, RVA 220, and into BPR 222. The RIF 218 serves as the interface between the MDC 202 and RDE 200 and passes data therebetween with the aforementioned flow-control protocol. RIF 218 also selects buffers in the MDC 202 that have non-empty status, un-maps physical port and port multiplier information using the VAP (discussed below) to get a RAID-5 and -6 logical drive identifiers and un-maps the logical drive identifier to get a corresponding RAID-4 logical drive identifier. RVA 214 decodes the DSA data from the MDC 202 when the RDE 200 handles out-of-order DSUs from the PMs 16. The BPR 222 reconstructs missing data for a degraded array using available intact data and parity information retrieved from the drives 18, 20. Recovered data from the BPR 222 is sent to the traffic manager via the TMI 204 for eventual transmission to the network 12 (FIG. 1).

As will be explained in more detail below and in one embodiment of the invention, a re-readable FIFO memory (a FIFO memory adapted to allow repeated reading of the same data in the order the data was loaded therein, referred to herein as a re-readable FIFO) TDB 224 holds at least a portion of the data to be written to the array of drives 18, 20 when the RDE 200 is configured for "tandem operation." As will be described in more detail below, tandem operation of system 10 has a first store operation automatically followed by a second store operation with the same data stored in both the first and second store operations (i.e., the second store operation occurs "in tandem" with the first store operation). By storing in TDB 224 the data to be stored during tandem operation, the need for retransmission of the data from the shared-memory 22 (FIG. 1) for the second operation is avoided, thereby making the RAID controller 14 faster for tandem operations than it would be without TDB 224. However, the TDB 224 is not needed if sufficient bandwidth is available from the shared memory 22 when the RDE 200 is configured for tandem operation. The size of the TDB 224 should be at least the size of one sector and does not need be larger.

As mentioned above, the application processor (not shown) in the controller 14 (FIG. 1) controls the operation of the RDE 200. The application processor loads control information in and out of CSR 226 via interface 228. Among other control registers described in the above-referenced patent application, in this embodiment the CSR 226 has therein three sets of registers, rRAC0-rRAC15, rRACMAP0-rRACMAP15, and rRACPMP0-rRACPMP15, to form sixteen "register triples," e.g., rRAC0, rRACMAP0, and rRACPMP0 form one register triple, rRAC1, rRACMAP1, and rRACPMP1 another register triple, etc. The information stored in the register triple is referred to herein as a storage profile (there are sixteen in this example) and will be explained in more detail in connection with Tables 1-3. Briefly, the register set rRAC0-rRAC15 stores the VAP information and the registers rRACMAP0-rRACMAP15 stores logical drive mapping information. The register set rRACPMP0-rRACPMP15 is optional and is used to configure the PMs 16 (FIG. 1) when they are present. Because, in this example, each register is 32 bits wide, it is convenient to use three registers for each storage profile. It is understood that each register triple may the considered a single register holding a storage profile. The storage profile used by the RDE 200 at any given time (except during the second and subsequent store operations when the RDE 200 is configured for tandem operation, as explained below) is selected in response to storage and retrieval requests in the IRM 214.

The VAP used by RDE 200 at any given time sets the desired RAID-level for the array of physical drives 18, 20. As described in the above-referenced patent application, the RDE 200 has multiple storage profiles stored therein (sixteen in this example), each storage profile having a VAP, each VAP having the RAID-level and some drive configuration information for the logical drives. As shown in FIG. 2, each VAP is stored in a corresponding one of sequentially numbered registers rRAC0-rRAC15 in CSR 226. The VAP information bit fields are shown in Table 1. The chunk size (K), the number of DSUs per stripe (K*(N−1)), the logical drive number of a degraded drive (Ldeg), RAID-level, and cluster size (N) are bit fields described in the above-referenced patent application. Briefly, these fields configure the RDE 200 when retrieving and storing data in the physical drives 18, 20 (FIG. 1). In this example, RAID-level 6 (an orthogonal double-parity RAID implementation tolerant of double disk-drive failures) may also be supported in addition to the previously described RAID-levels.

Each exemplary VAP in Table 1 has a flag, "Tandem," that is used during a first RAID store operation to initiate a second (or more) RAID store operation. The second store operation stores the same data stored during the first store operation. However, the second store operation is done in accordance with a second VAP different from the (first) VAP used during the first store operation. In this embodiment, the second VAP is preferably stored in a profile register rRAC0-rRAC15 sequentially subsequent to the profile register containing the first VAP. For example, if a RAID store operation is executed using the VAP stored in the fourth profile register, rRAC3, and the Tandem flag is set, then a second store operation is executed storing the same data but using the VAP in register rRAC4. For this embodiment, using rRAC15 for the first VAP will result in using rRAC0 for the second VAP. Thus, the additional store operations are conducted transparently to the network 12 (FIG. 1) and, depending on the state of a Tandem flag in the VAPs, multiple additional store operations may be executed, although the number of additional store operations is typically limited to one. Further, tandem operation allows for the efficient initialization of the physical drives 18, 20 with uniform data, e.g., all ones or all zeros. In this embodiment, the Tandem flag has no effect on a RAID retrieval operation.

As discussed above, the data used during a tandem operation may be held in the shared memory 22 or, advantageously for faster operation of the RDE 200, in the TDB 224.

TABLE 1

Virtual Array Profile in RAC Profile Registers rRAC0-rRAC15

| Bit Position | Field | Description |
|---|---|---|
| 31:24 | Chunk-size | Number of sectors per chunk (K) |
| 23:12 | Stripe-DSUs | Number of Data Sectors per stripe ie: K * (N − 1) |
| 11 | Tandem | This cluster is mated to its tandem partner |
| 10:7 | Ldeg | Logical Number of the degraded drive |
| 6 | degraded | Cluster to be treated as degraded |
| 5:4 | RAID-level | 0-RAID5 |
| | | 1-RAID4 |
| | | 2-RAID0(N > 1) |
| | | 2-JODD(N = 1) |
| | | 3-RAID6 |
| 3:0 | Cluster-size | Number of drives configured for cluster |

As stated above, each storage profile includes a VAP and logical-to-physical drive mapping information. The following Tables 2 and 3 illustrate exemplary bit fields used in the mapping. For each storage profile, entries the corresponding mapping register rRACMAP0-rRACMAP15 are used to map logical drive numbers (eight in this example, although the fields and register sizes can be increased to allow for 16 or more logical drives) to physical ports on the MDC 202. While a logical drive number is unique, a physical port (e.g., port0, port1, etc.) may be assigned to multiple logical drives. Therefore and assuming no PMs 16 (FIG. 1) are used (the physical drives are coupled directly to the MDC 202), the physical drives 18, 20 (FIG. 1) may be assigned to multiple logical drives by entries in the rRACMAP registers. In this example, four bits are available for each of the eight logical drives, thus allowing for up to sixteen physical ports (or physical drives) on MDC 202. If the PMs 16 are present, the rRACMAP registers are in effect used to map the logical drive numbers to the PMs 16 attached to the physical ports.

As stated above, PMs 16 (FIG. 1) may be used to provide for more physical drives to be accessed by the controller 14 than there are ports on the MDC 202. Configuration of the PMs 16 is accomplished though the rRACPMP0-rRACPMP15 registers. Similar to the rRACMAP registers and for each storage profile, the port multiplier registers rRACPMP0-rRACPMP15 are used to map logical drive numbers to physical ports on the PM 16 selected in accordance with entries in the corresponding rRACMAP0-rRACMAP15 registers. In this embodiment and for each storage profile, each of the PMs 16 may be configured as shown in Table 3 using port multiplier port entries in the port multiplier registers rRACPMP0-rRACPMP15. Since there are four bits associated with each logical drive in the rRACPMP registers and each PM has one port (PMP15 in this example) reserved for configuring the PM, there may be up to fifteen ports on each PM for coupling to a physical drive. Therefore, in this example, since there are up to eight PMs and each PM can have up to fifteen ports (drives), controller 14 may control up to 120 physical drives. The following example illustrates how the rRACMAP and rRACPMP registers work together to specify a certain physical drive: in a first exemplary storage profile, e.g., storage profile #3, logical drive #2 is mapped to physical port1 (corresponding to a PM1 in FIG. 1) in the rRACMAP3 register (PD2=1), and the logical drive 2 is mapped to port5 in the rRACPMP3 register (PMP2=2). Therefore, when using storage profile #3 in this example, a store or retrieval operation to logical drive 2 will access physical drive $20_2$ (FIG. 1). Thus, each storage profile maps the logical drives in that profile to a physical drive in a set of physical drives.

TABLE 2

Logical Drive to Physical Port Mapping Registers rRACMAP0-rRACMAP15

| Bit Position | Field | Description |
| --- | --- | --- |
| 31:28 | PD7 | Physical Port for Logical Drive 7 |
| 27:24 | PD6 | Physical Port for Logical Drive 6 |
| 23:20 | PD5 | Physical Port for Logical Drive 5 |
| 19:16 | PD4 | Physical Port for Logical Drive 4 |
| 15:12 | PD3 | Physical Port for Logical Drive 3 |
| 11:8 | PD2 | Physical Port for Logical Drive 2 |
| 7:4 | PD1 | Physical Port for Logical Drive 1 |
| 3:0 | PD0 | Physical Port for Logical Drive 0 |

TABLE 3

Logical Port Multiplier Registers rRACPMP0-rRACPMP15

| Bit Position | Field | Description |
| --- | --- | --- |
| 31:28 | PMP7 | Port Multiplier Port for Logical Drive 7 |
| 27:24 | PMP6 | Port Multiplier Port for Logical Drive 6 |
| 23:20 | PMP5 | Port Multiplier Port for Logical Drive 5 |
| 19:16 | PMP4 | Port Multiplier Port for Logical Drive 4 |
| 15:12 | PMP3 | Port Multiplier Port for Logical Drive 3 |
| 11:8 | PMP2 | Port Multiplier Port for Logical Drive 2 |
| 7:4 | PMP1 | Port Multiplier Port for Logical Drive 1 |
| 3:0 | PMP0 | Port Multiplier Port for Logical Drive 0 |

OPERATIONAL EXAMPLE

The following example illustrates operation of the RAID system 10 in FIG. 1 during tandem operation. For this example, there are multiple storage profiles stored in the RDE 200 (FIG. 2) and a first one of the storage profiles (here profile #4) is configured as follows:

| Logical Drive No. | Port No. | PM Port No. |
| --- | --- | --- |
| 0 | 0 | 0 |
| 1 | 0 | 1 |
| 2 | 0 | 2 |

N = 3, K = 16, RAID-4, and Tandem flag set.

A second one of the storage profiles (here profile #5) is configured as follows:

| Logical Drive No. | Port No. | PM Port No. |
| --- | --- | --- |
| 0 | 1 | 0 |
| 1 | 1 | 1 |
| 2 | 1 | 2 |

N = 3, K = 16, RAID-4, and Tandem flag reset.

In this example, in the first storage profile (profile #4 is stored in register triple rRAC3, rRACMAP3, and rRACPMP3), logical drive 0 corresponds to drive $18_0$ (FIG. 1), logical drive 1 to drive $18_2$, and logical drive 3 to drive $18_2$, the drives 18 being a first set of physical drives. Similarly, in the second storage profile (profile #5 is stored in register triple rRAC4, rRACMAP4, and rRACPMP4), logical drive 0 corresponds to drive 200 (FIG. 1), logical drive 1 to drive $20_2$, and logical drive 3 to drive $20_2$, the drives 20 being a second set of physical drives. Executing a store operation using storage profile #4 stores data in the physical drives $18_0$-$18_2$ using RAID-4 parity encoding. Because the Tandem flag is set, the RDE 200 (FIG. 2) automatically stores the same data using the storage profile #5 (the next profile sequentially after profile #4) in physical drives $20_0$-$20_2$. Since the Tandem flag is reset in the profile #5, no further stores occur using the same data. Because, in this example, the storage profiles #4 and #5 map to different sets of physical drives, there is additional redundancy that can be taken advantage of during a retrieval of data: instead of relying on parity encoding to reconstruct stored data when one physical drive of one set of physical drives is degraded (a relatively slow process), the physical drive in the other set of physical drives corresponding to the degraded drive may be used instead to retrieve data at full-speed. Additionally, if multiple drives degrade, the recovery of data can use physical drives from different physical drive sets to provide additional fault tolerance in the RAID system 10.

Advantageously, all of the digital circuitry of the RAID controller 14 and port multipliers 16 may be implemented in one or more programmable digital processors or fixed logic devices, such as microprocessors, digital signal processors (DSP), programmable logic devices (PLD), gate arrays, etc.

Although the present invention has been described in the context of a RAID storage system, those skilled in the art will understand that the present invention can be implemented in the context of other types of storage systems.

For purposes of this description and unless explicitly stated otherwise, each numerical value and range should be interpreted as being approximate as if the word "about" or "approximately" preceded the value of the value or range. Further, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements.

It is understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method of accessing a RAID system having a plurality physical storage devices, comprising the steps of:
   a) buffering data in a memory in the RAID system;
   b) storing the buffered data in at least one of the plurality of physical storage devices in accordance with a first storage profile; and
   c) storing the buffered data in at least one of the plurality of physical storage devices in accordance with a second storage profile different from the first profile;
   wherein the first profile contains a flag; and wherein whether step c) is executed depends on the flag.

2. The method of claim 1, further comprising the step of:
   d) retrieving, in accordance with a retrieval storage profile, data stored in at least one of the plurality of physical storage devices.

3. The method of claim 1, wherein the buffered data is stored in a first subset of the plurality of physical storage devices in accordance with the first profile, and the buffered data is stored in a second subset of the plurality of physical storage devices in accordance with the second profile.

4. The method of claim 3, wherein the physical storage devices in the first subset of the plurality of physical storage devices is different from the physical storage devices in the second subset of the plurality of physical storage devices.

5. The method of claim 1, wherein the first and second profiles are stored in sequential profile registers, further comprising the steps of:

e) selecting a first profile register having the first profile therein; and
   f) selecting a second profile register, sequentially subsequent to the first profile register, having the second profile therein.

6. The method of claim 5, wherein a third profile is stored in a third profile register different from the first and second profile registers; further comprising the step of:
   g) selecting from at least the first, second, or third profile registers a retrieval storage profile; and
   h) retrieving, in accordance with the retrieval storage profile, data stored in at least one of the plurality of physical storage devices.

7. The method of claim 5, wherein at least the first profile contains a flag; and wherein whether steps c) and f) are both executed depends on the flag.

8. The method of claim 1, wherein each of the storage profiles includes logical-to-physical storage device mapping and RAID-level information.

9. The method of claim 1, further comprising the step of:
   i) holding in a re-readable FIFO the buffered data from the memory;
   wherein the buffered data held in the re-readable FIFO is the buffered data stored in step c).

10. The method of claim 9, wherein the buffered data has a minimum size, and the re-readable FIFO is sized to hold at least the minimum size of buffered data.

11. A RAID system having a plurality of physical storage devices, the system comprising:
    a memory adapted to hold data therein as buffered data; and
    a plurality of sequentially ordered profile registers;
    wherein the RAID system adapted to store, in accordance with a first storage profile, the buffered data in at least one of the plurality of physical storage devices; wherein the system is further adapted to store, in at least one of the plurality of physical storage devices, the buffered data in accordance with a second storage profile different from the first profile; and wherein the first and second profiles are stored in sequential first and second profile registers.

12. The system of claim 11, wherein a third profile is stored in a third profile register different from the first and second profile registers;
    wherein the system is adapted to select from at least the first, second, or third profile registers a storage profile for retrieving data stored in at least one of the plurality of physical storage devices.

13. The system of claim 11, wherein at least the first profile contains a flag; and wherein the storing of the buffered data in the RAID system in accordance with the second storage profile depends on the flag.

14. The system of claim 11, wherein the buffered data has a minimum size, and wherein the memory is a buffer sized to hold at least the minimum size of the data.

15. The system of claim 11, further comprising:
    a re-readable FIFO adapted to hold the buffered data from the memory;
    wherein the buffered data held in the re-readable FIFO is the buffered data stored in accordance with the second storage profile.

16. A method of accessing a RAID system having a plurality of physical storage devices, comprising the steps of:
    a) buffering the data in a memory;
    b) selecting a first profile register having the first profile therein, the first profile containing a flag;

c) storing the buffered data in at least one of the plurality of physical storage devices in accordance with the first storage profile;

d) selecting a second profile register, different from the first profile register, having a second profile therein; and e) storing the buffered data in at least one of the plurality of physical storage devices in accordance with the second storage profile;

wherein whether the steps d) and e) are both executed depends on the flag.

17. The method of claim 16, further comprising the steps of:

f) selecting a first profile register having the first profile therein; and g) selecting a second profile register, sequentially subsequent to the first profile register, having the second profile therein.

18. The method of claim 16, further comprising the step of:

h) holding in a re-readable FIFO the buffered data from the memory;

wherein the buffered data held in the re-readable FIFO is the buffered data stored in step e).

19. A method of accessing a RAID system having a plurality physical storage devices, comprising the steps of:

a) buffering data in a memory in the RAID system;

b) storing the buffered data in at least one of the plurality of physical storage devices in accordance with a first storage profile; and c) storing the buffered data in at least one of the plurality of physical storage devices in accordance with a second storage profile different from the first profile;

d) selecting a first profile register having the first profile therein; and e) selecting a second profile register, sequentially subsequent to the first profile register, having the second profile therein;

wherein the first and second profiles are stored in sequential profile registers.

20. The method of claim 19, wherein a third profile is stored in a third profile register different from the first and second profile registers; further comprising the step of:

f) selecting from at least the first, second, or third profile registers a retrieval storage profile; and g) retrieving, in accordance with the retrieval storage profile, data stored in at least one of the plurality of physical storage devices.

21. The method of claim 19, wherein at least the first profile contains a flag; and wherein whether steps c) and e) are both executed depends on the flag.

22. A RAID system having a plurality of physical storage devices, the system comprising:

a memory adapted to hold data therein as buffered data;

wherein the RAID system adapted to store, in accordance with a first storage profile, the buffered data in at least one of the plurality of physical storage devices; wherein the system is further adapted to store, in at least one of the plurality of physical storage devices, the buffered data in accordance with a second storage profile different from the first profile; wherein at least the first profile contains a flag; and wherein the storing of the buffered data in the RAID system in accordance with the second storage profile depends on the flag.

23. The system of claim 22, further comprising:

a plurality of sequentially ordered profile registers;

wherein the first and second profiles are stored in sequential first and second profile registers.

24. The system of claim 23, wherein a third profile is stored in a third profile register different from the first and second profile registers;

wherein the system is adapted to select from at least the first, second, or third profile registers a storage profile for retrieving data stored in at least one of the plurality of physical storage devices.

25. The system of claim 22, wherein the buffered data has a minimum size, and wherein the memory is a buffer sized to hold at least the minimum size of the data.

26. The system of claim 22, further comprising:

a re-readable FIFO adapted to hold the buffered data from the memory;

wherein the buffered data held in the re-readable FIFO is the buffered data stored in accordance with the second storage profile.

* * * * *